United States Patent

Hilbig

[15] 3,637,041
[45] Jan. 25, 1972

[54] SOUND SUPPRESSION SYSTEM FOR FAN JET ENGINES

[72] Inventor: Jack H. Hilbig, Chula Vista, Calif.
[73] Assignee: Rohr Corporation, Chula Vista, Calif.
[22] Filed: Sept. 2, 1970
[21] Appl. No.: 68,867

[52] U.S. Cl. ..................181/33 HC, 181/33 HD, 181/51, 239/265.17, 239/265.33
[51] Int. Cl. ..................B64d 33/06, F01n 1/14
[58] Field of Search ..................181/33.22, 33.221, 33.222, 181/43, 51; 239/265.11, 265.13, 265.17, 127.3, 265.33

[56] References Cited

UNITED STATES PATENTS

| | | | |
|---|---|---|---|
| 3,237,864 | 3/1966 | Taylor et al. | 239/265.17 X |
| 3,306,394 | 2/1967 | Smith et al. | 181/33.221 |
| 3,436,020 | 4/1969 | Duthion et al. | 239/265.13 |
| 3,556,246 | 1/1971 | Hilbig | 181/51 |
| 3,566,989 | 3/1971 | Ellis | 181/51 |

Primary Examiner—Robert S. Ward, Jr.
Attorney—George E. Pearson

[57] ABSTRACT

System is intended for use with a jet engine having an engine separator sleeve for discharging turbine exhaust gases, and an engine casing surrounding and spaced from the separator sleeve to form therewith an annular flow path for fan air rearwardly around the exhaust gas stream. A tail pipe is attached to and forms a continuation of the engine casing and defining a discharge zone to receive and control the turbine exhaust gas and fan airstreams. A series of partitions extend generally inwardly in alternately arranged pairs from the tailpipe in fore-and-aft planes to define a peripherally arranged series of flow passages for gas and air. A guide vane pivotally mounted in each passage has a stowed position aligned with the separator sleeve to form a continuation thereof and segregate turbine exhaust gas and fan airflow. The vanes swing in unison, but in alternately opposite directions about transverse axes to cause their leading ends to swing radially in and out in alternation about the periphery so that one set of vanes directs fan air into the engine exhaust gas flow path, and the other set of alternately interposed vanes directs turbine exhaust gas into the fan airflow path. The result is a thorough intermixing of air and exhaust gas before leaving the engine nozzle, thereby reducing the temperature and velocity of the mixture and lowering the total jet noise.

10 Claims, 13 Drawing Figures

INVENTOR.
JACK H. HILBIG
BY George E. Pearson
ATTORNEY

INVENTOR.
JACK H. HILBIG

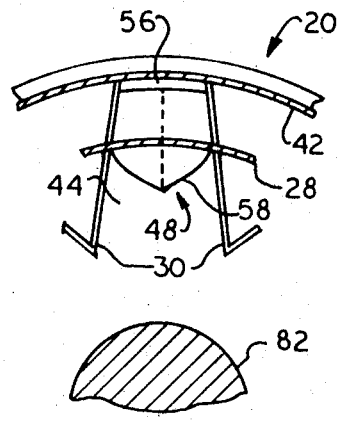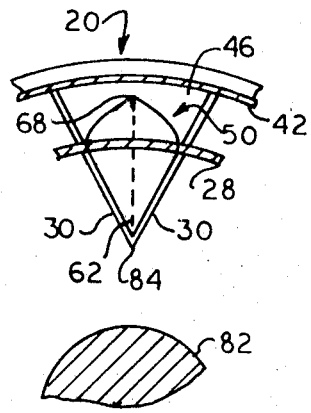
FIG. 5  FIG. 6
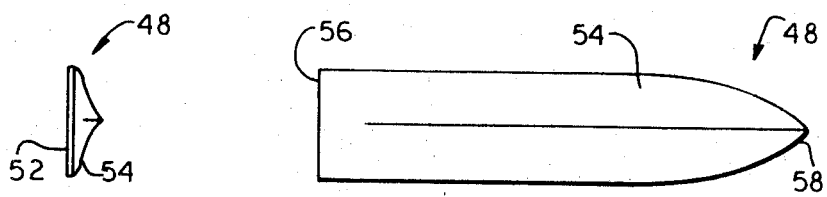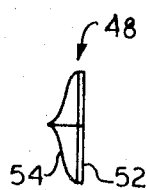
FIG. 8  FIG. 7  FIG. 9
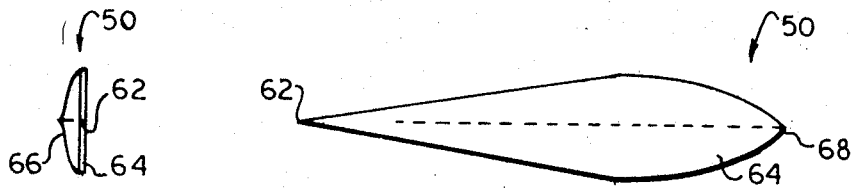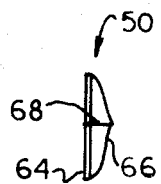
FIG. 11  FIG. 10  FIG. 12
INVENTOR.
JACK H. HILBIG
BY
ATTORNEY

INVENTOR.
JACK H. HILBIG

SOUND SUPPRESSION SYSTEM FOR FAN JET ENGINES

BACKGROUND OF THE INVENTION

This invention lies in the field of sound suppression of gas turbine or jet engines, which produce reaction thrust by ejecting a high-velocity stream of gas from the exhaust nozzle. One of the problems of airplanes equipped with jet engines on which a great deal of effort has been expended is that the exhaust stream creates a very high level of sound energy of "noise" in a wide range of frequencies, and a portion of this noise reaches the ground from low flying airplanes, as during takeoff and climb, at an energy level which is not acceptable to the public.

The invention is directed to a system in which air is mixed with the turbine exhaust gas to cool it and thereby reduce the velocity of the exiting gas stream from the nozzle, all of which functions cooperate to reduce the total jet noise. It is directed particularly to a system of this type applied to a fan jet engine in which maximum use is made of the fan air in reducing the noise level. While various schemes have been proposed for applying sound suppression systems to fan jet engines, so far as known none of them has made full use of the possibilities for achieving optimum results.

SUMMARY OF THE INVENTION

The present invention provides a very satisfactory solution to the problem with a relatively small amount of equipment and few moving parts, most of which are quite simple in form and of duplicate type. Generally stated, the system is intended for location immediately aft of a typical fan jet engine having a primary turbine exhaust gas stream surrounded by a secondary fan airstream. The system includes a tailpipe which is attached to and forms a continuation of the engine casing and defines a discharge zone. A series of partitions are spaced around the periphery of the inner wall of the shroud and extend radially inward, also lying in fore and aft planes, to divide the discharge zone generally into two sets of alternately interposed flow passages.

A fore-and-aft extending vane is located in each passage and in preferred form is pivotally mounted aft of its leading end to swing about a transverse axis. The leading ends of the vanes in one set of passages are arranged to have their leading ends swing outwardly to deploy, while those of the vanes of the other set are arranged to swing inwardly. The pivotal mountings are so located that the vanes in stowed position lie in continuation of the wall of the primary nozzle and tend to maintain segregated the turbine exhaust gas and fan air streams, although the basic purpose is to minimize obstruction to gas and airflow in cruising flight.

When the vanes are deployed, the first set deflects fan air inwardly into the turbine exhaust gas flow and the second set deflects turbine exhaust gas outwardly into the fan airflow. Thus a thorough intermixing of all of the gases is produced to reduce the noise level as mentioned above. An engine tail cone may be coaxially mounted behind the engine if desired to improve the cross-sectional flow area. In any event, the partitions may extend inward all or a part of the radial distance available as indicated by design considerations.

BRIEF DESCRIPTION OF THE DRAWINGS

Various advantages and features of novelty will be apparent as the description proceeds in conjunction with the accompanying drawings, in which:

FIG. 5 is a sectional view taken on line 5—5 of FIG. 2.
FIG. 6 is a sectional view taken on line 6—6 of FIG. 3.
FIG. 7 is a plan view of one of the vanes of the first set.
FIG. 8 is an end view of the leading end of a first vane.
FIG. 9 is an end view of the trailing end of a first vane.
FIG. 10 is a plan view of one of the vanes of the second set.
FIG. 11 is an end view of the leading end of a second vane.
FIG. 12 is an end view of the trailing end of a second vane.

DESCRIPTION OF PREFERRED EMBODIMENT

Figure 1:
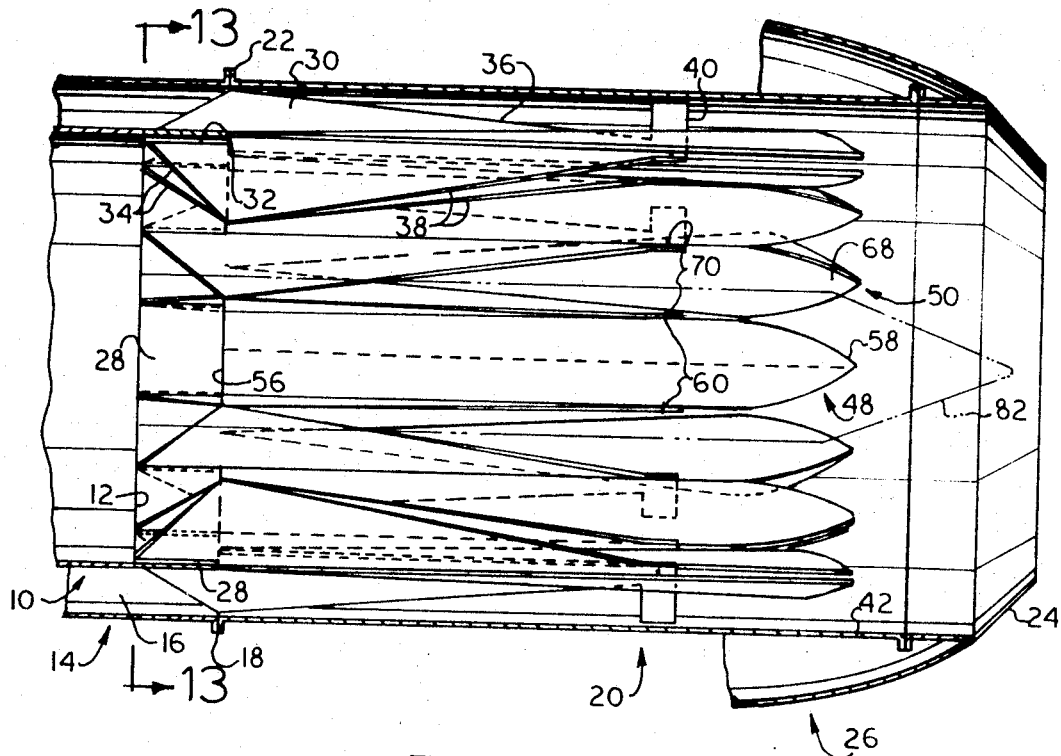
FIG. 1 is a schematic longitudinal diametrical sectional view of the aft end portion of a fan jet engine assembly in which is incorporated gas control and mixing means embodying the present invention.

The general arrangement of the system of the invention is illustrated in FIG. 1, in which a typical fan jet engine 10 has an exit plane 12 through which are discharged the exhaust gases from the turbine. Casing 14 surrounds engine 10 and is radially spaced therefrom to define a passage 16 for the rearward flow of air from the fan or compressor of the engine, and has an exit plane 18. A tailpipe 20 which is generally cylindrical has a leading edge 22 connected to the engine casing at its exit plane 18 to form a continuation thereof and may terminate in a usual convergent nozzle 24. The entire engine assembly and the major part of the tailpipe and nozzle are preferably encased in a cowl 26 which may be a nacelle, the aft portion of a fuselage, or other aircraft structure.

Figure 13:
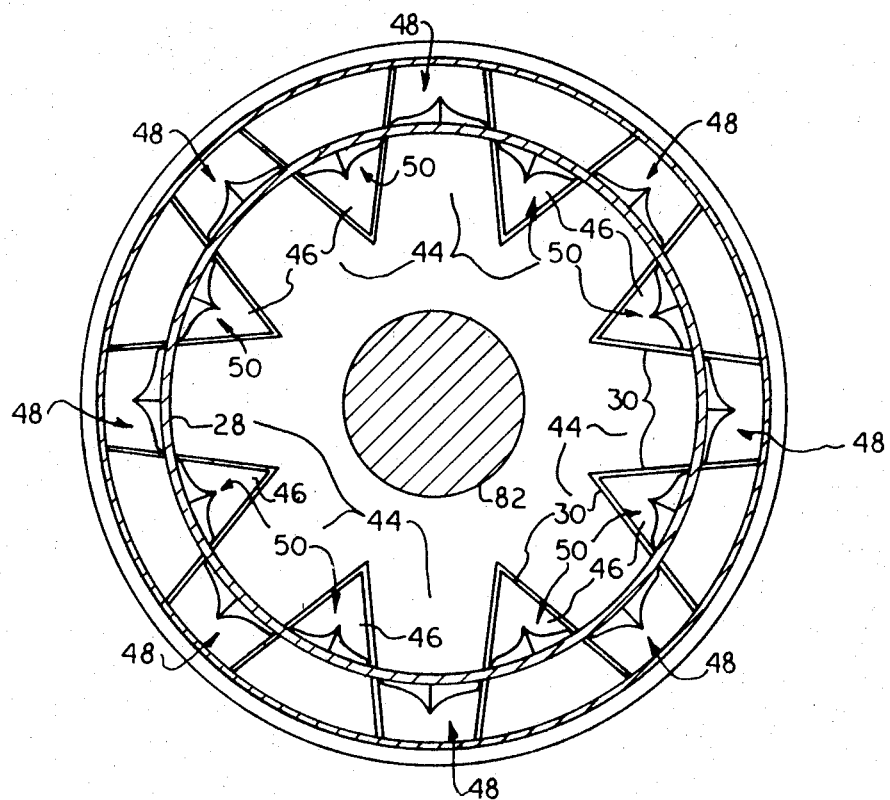
FIG. 13 is a sectional view taken on line 13—13 of FIG. 1.

A short, cylindrical support ring 28 of the same diameter as the separating sleeve 10 is in endwise abutting relation with, and forms a continuation of it. A plurality of identical partitions 30, best shown in FIGS. 1 and 13, are provided with longitudinally extending notches 32 in their leading ends 34, and the ring 28 is fitted into these notches and the partitions are secured thereto by any suitable means, such as welding. Each partition 30 has the planform shown, with tapered leading end, the outer edge 36 being cut away to be convergent rearwardly while the inner edge 38 is tapered to be divergent rearwardly. The outer edge of its widest part, and a tab 40 on the aft end of each partition 30 are secured as by welding to the inner wall 42 of the tailpipe 20.

As best seen in FIG. 13, the partitions 30 are in alternately arranged pairs, with the two partitions of a pair of one set being spaced laterally from, and generally parallel to, a fore-and-aft plane extending radially through the axis of the tailpipe casing, thus forming a fore-and-aft flow passage 44, see FIGS. 5 and 13, which is substantially rectangular in cross section. The partitions of the next alternate pair converge and meet at an acute angle to define a generally triangular passage 46, see FIGS. 6 and 13, with its apex inward and its base formed by the wall of the tailpipe. The radially inward sides of rectangular passages 44 are open from end to end, but their effective cross-sectional area gradually decreases rearwardly because of the divergent planform of inner edges 38 of the partitions. On the other hand the triangular passages 46 are fully closed at the aft edge of ring 28 where the planform of each partition is widest, and the apex gradually opens rearwardly because of the divergent planform of inner edges 38 of the partitions, thus forming a wedge-shaped opening toward the shroud axis.

Figure 2:
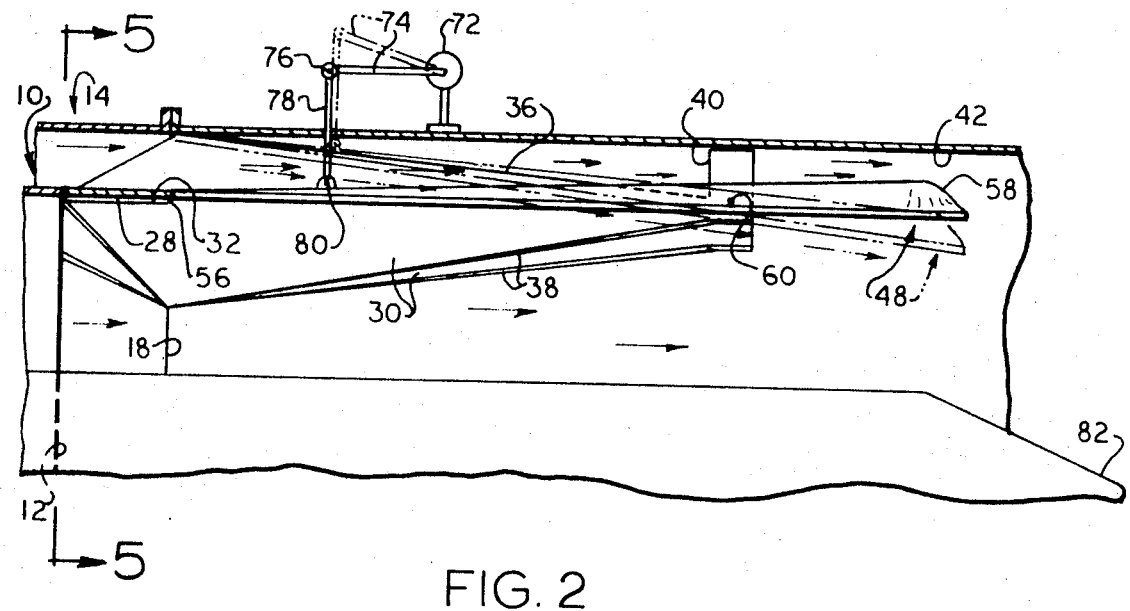
FIG. 2 is a fragmentary schematic longitudinal sectional view showing one of a first set of vanes which deflect fan air into the primary gas stream, the vane being shown in stowed position in solid lines and in deployed position in broken lines.

A guide vane is pivotally mounted in each passageway to perform the mixing function of the invention. A first set of vanes 48 is provided, one for each passage 44, and a second set of vanes 50 is provided, one for each passage 46. Each vane 48, as best shown in FIGS. 7, 8, and 9, is generally rectangular in planform in its forward portion and throughout most of its length, and has one generally planar face 52, which is the inner face in the assembly, and an opposite, ridged, aerodynamically faired face 54. It is rather thin and flat at its leading end 56 and converges to a point at its trailing end 58. Each vane 48 fits within its rectangular passage 44, and is pivotally mounted on a transverse axis aft of its leading end to the adjacent partitions defining such passage. The pivotal mounting axis 60, see FIG. 2, is located at the tabs 40, and preferably about two thirds of the length of the vane aft of its leading end. The radial placement of the pivotal axis is about the same distance from tailpipe wall 42 as the support ring 28, so that when the vane is in stowed position it forms a partial continuation of the separator sleeve 10, creating minimum flow resistance and tending to maintain separate the turbine exhaust gas from the fan air.

Each vane 50, as best shown in FIGS. 10, 11 and 12, is quite streamlined in planform, being widest about two thirds of its length aft of its leading edge 62, where it is pivotally mounted. It has one generally planar face 64, which is the outer face in the assembly, and an opposite, ridged, aerodynamically faired face 66. It has a gradual taper forwardly to its leading end 62 and a more abrupt taper rearwardly to its trailing end 68. The gradually tapered forward portion swings inwardly and fits into the apex of the triangular passage 46, and is pivotally mounted at 70 to the adjacent partitions, the pivots 70 having the same radial placement as the pivots 60. Thus, when vane 50 is in stowed position it also forms a partial continuation of the separator sleeve 10.

Figure 3:
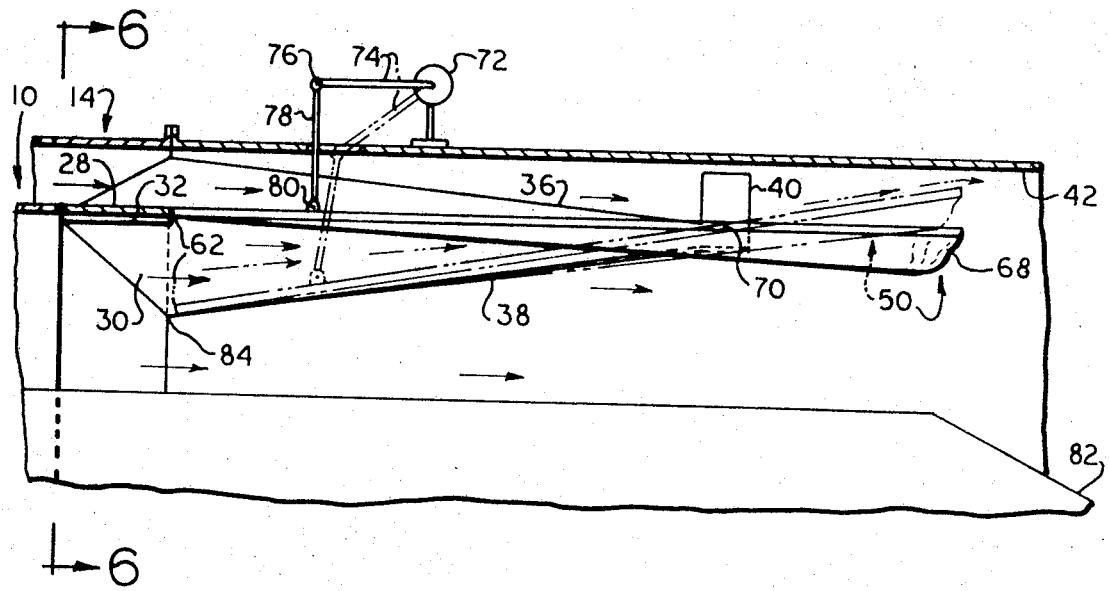
FIG. 3 is a view similar to FIG. 2 showing one of the second set of vanes which deflect gases from the turbine exhaust gas flow into the fan airflow.

All of the vanes of both sets are swung in unison from their stowed positions, shown in solid lines in FIGS. 2 and 3, to deployed position shown in broken lines in said figures, with leading ends 56 of vanes 48 swinging out toward inner wall of tailpipe 42, and the leading ends 62 of vanes 50 swinging in toward the cowl axis. Thus, in deployed position, vanes 48 direct fan air from the passage 16 in to mix with the turbine exhaust stream, while vanes 50 direct turbine exhaust gas out to mix with the fan airstream.

Considering the two sets of vanes separately, FIGS 2 and 5 illustrate the movement and function of one vane 48 of the first set. The vane is shown in FIG. 2 in solid lines in its stowed position forming a continuation of separator sleeve 10 and ring 28. Actuating means is provided in the form of a rotary actuator 72 having a crank arm 74 pivotally connected at 76 to a link 78 which in turn is pivotally connected at 80 to the vane. Separate actuators may be used or a number of them may be driven together by any suitable driving means extending around the periphery. When deployed, the leading end 56 of vane 48 swings out adjacent to or in contact with wall 42, as shown in broken lines in FIG. 2 and in solid lines in FIG. 5, substantially blocking flow of fan air through the passage and deflecting the fan air inward to mix with the exhaust gas stream. Since the edge 38 of the partition diverges rearward and the aft portion of the vane is tapered, there is adequate flow area. The position of the aft portion of the vane causes it to act as a rake tooth to increase the mixing effect. In FIG. 5, looking aft, it will be seen that leading edge 56 of the vane is at or close to wall 42 while the trailing edge 58 has moved to a position close to engine tail cone 82 and divides the rearward flow to increase mixing.

FIGS. 3 and 6 illustrate the movement and function of one vane 50 of the second set. The vane is shown in FIG. 3 in solid lines in its stowed position forming a continuation of separator sleeve 10 and ring 28. The same actuating means may be used as described in connection with FIG. 2, but controlled to move in the opposite sense. It will be remembered that the two adjacent partitions 30 are inclined toward each other to form a triangular passage, and they actually contact at point 84 substantially in the plane of the aft edge of ring 28. This is clearly shown in FIG. 6. It will be seen in FIG. 1 that edges 38 diverge to form a rearwardly divergent opening between the partitions. When vane 50 is deployed, its leading end 62 swings inwardly to a point close to the junction 84 as shown in broken lines. In this position, because of its planform and triangular cross section, the vane fills the gap between the two partitions and prevents rearward flow of gas in the inner area. Instead, it directs turbine exhaust gas outwardly to mix with the fan airflow. The portion of the vane aft of pivot 70 does not completely block flow but does act as a rake tooth to promote mixing. The gap between partition edges 36 and shroud wall 42 provides passages for some of the mixture to spill over into the rectangular passages 44 which are blocked near their forward ends by vanes 48. In FIG. 6, looking aft, it will be seen that the vane 50 in deployed position lies in the bottom of the trough with its leading end 62 adjacent to point 84 and its trailing end 68 near to but spaced from wall 42 to provide a substantial flow area.

Figure 4:
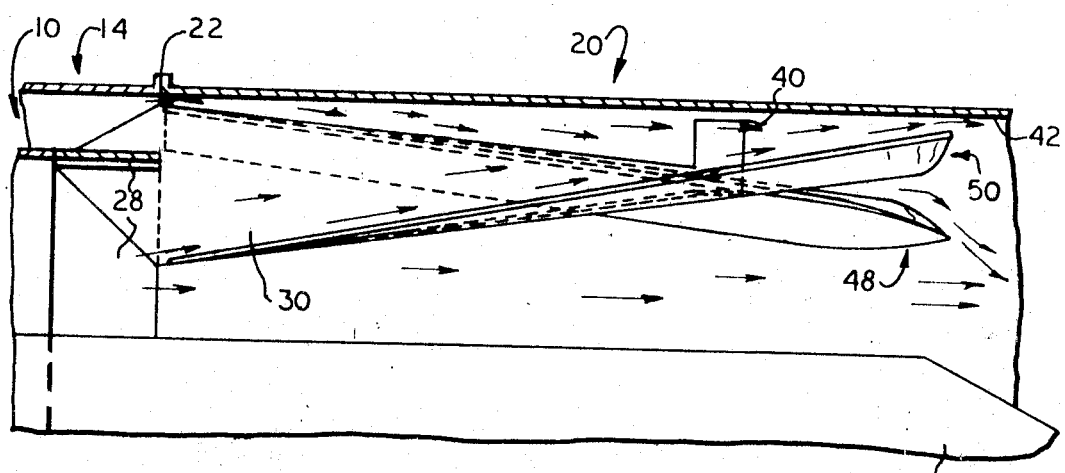
FIG. 4 is a diagrammatic view showing the annular fan air passage developed to a straight, rectangular passage, and two alternate vanes mounted coaxially therein, both of the vanes being shown in their deployed positions.

FIG. 4 illustrates diagrammatically the manner in which the alternately moving vanes produce an extremely high mixing effect. Vane 48 is deflecting fan air into the turbine exhaust gas flow, while adjacent vane 50 is deflecting turbine exhaust gas into the fan airflow. This alternate diversion of turbine exhaust gas and fan air into the main stream of the other, combined with the spillover effect across partition edges 36 and 38 insures a thorough intermixing of the gases even before they are ejected into the atmosphere. On the other hand, when all of the vanes are stowed, they offer practically no obstruction to the free flow of air and gas for optimum efficiency in the cruising regime.

Having thus described the invention, what is claimed as new and useful and desired to be secured by U.S. Letters Patent is:

1. A sound suppression system for use in combination with a fan jet engine having a rearwardly discharging primary tailpipe for the exhaust gas stream and a secondary tailpipe surrounding the primary tailpipe and radially spaced therefrom for rearward flow of the fan airstream around the exhaust gas stream, comprising: a shroud connected to the secondary tailpipe and forming a continuation thereof and defining a discharge zone to receive and control the gas and airstreams; a plurality of partitions located within the shroud and arranged in peripherally spaced relationship; the partitions lying in fore-to-aft planes extending generally radially inward from the inner wall of the shroud to define a plurality of axially directed flow passages for the primary gas and secondary air; guide vanes located in said passages and having stowed positions in which they form virtual continuations of the wall of the primary tailpipe and substantially separate the air and gas streams; some of the vanes being movable to deployed positions in which they direct some of the airstream inwardly to mix with the gas stream; and some of the vanes being movable to deployed positions in which they direct some of the gas stream outwardly to mix with the airstream.

2. A system as claimed in claim 1; a first set of vanes comprising those vanes which are deployed to direct some of the airstream inwardly and being spaced peripherally around the inner wall of the shroud; and a second set of vanes comprising those vanes which are deployed to direct some of the gas stream outwardly and being spaced peripherally around the inner wall of the shroud; each vane of each set being located between two vanes of the other set.

3. A system as claimed in claim 2; the vanes being pivotally mounted to their adjacent partitions on transverse axes spaced aft of their leading edges; the leading edges of the first set being swingable outward toward the wall of the shroud; and the leading edges of the second set being swingable inward toward the center of the shroud.

4. A system as claimed in claim 2; the axes of the pivotal mountings of the vanes being aft of their leading edges a distance of approximately two thirds of their length.

5. A system as claimed in claim 3; the aft ends of the vanes being convergent rearwardly and in deployed position alternately extending inwardly and outwardly to produce turbulence and increased mixing of the gas and air.

6. A system as claimed in claim 3; and a bullet extending coaxially aft of the primary nozzle and of smaller diameter and defining the inner wall of the gas flow passage; the partitions adjacent their forward ends extending radially from the shroud inner wall substantially to the bullet to define discrete entrances to the passages formed by the partitions.

7. A system as claimed in claim 3; and a support ring connected to the primary nozzle and forming a continuation thereof; the partitions being secured to the support ring at their forward ends to retain them in their proper relation.

8. A system as claimed in claim 3; the partitions being arranged in pairs; the two partitions of each pair being laterally spaced from and parallel to a fore to aft plane extending radially from the axis of the shroud to form a passage of generally rectangular cross section; a partition of each pair meeting the adjacent partition of the next succeeding pair at an angle to form a passage having a generally triangular cross section with an inner apex and a base at the shroud wall; the inner edges of the partitions diverging rearwardly from the shroud axis to form rearwardly diverging openings at the inner sides of the triangular passages; the vanes of the first set being generally rectangular in planform and swingable to deployed position to substantially fully block rearward air flow through the radially outer portions of their respective passages and direct the air inwardly to mix with the gas in the radially inner portions of their respective passages; the vanes of the second set in planform converging forwardly from their pivotal mounting axes in conformance with the openings in their passages and being swingable to deployed position to substantially fully block the openings in their respective passages and direct the gas flow outward to mix with the fan air.

9. A system as claimed in claim 8; the vanes of the second set being triangular in cross section throughout at least the major portion of their length with a radially inner apex and outer base to conform generally with the cross section of their respective passages.

10. A system as claimed in claim 8; the deployed position of the second set of vanes producing a gradual rearward reduction in flow area of the triangular passages; and the outer edges of the partitions being cut away in a rearwardly convergent direction to provide lateral flow paths for the excess gas and air mixture to flow laterally into the adjacent rectangular flow passages.

* * * * *